(12) United States Patent
Umehara (10) Patent No.: US 8,240,188 B2
(45) Date of Patent: Aug. 14, 2012

(54) RESPONSE SENSING DEVICE OF EXHAUST GAS COMPONENT CONCENTRATION SENSOR

(75) Inventor: Akira Umehara, Kariya (JP)

(73) Assignee: Denso Corporation, Kariya (JP)

( * ) Notice: Subject to any disclaimer, the term of this patent is extended or adjusted under 35 U.S.C. 154(b) by 244 days.

(21) Appl. No.: 12/836,850

(22) Filed: Jul. 15, 2010

(65) Prior Publication Data

US 2011/0011153 A1   Jan. 20, 2011

(30) Foreign Application Priority Data

Jul. 16, 2009   (JP) ................................. 2009-168128

(51) Int. Cl.
*F02D 9/04* (2006.01)
(52) U.S. Cl. .................... 73/23.32; 73/23.2; 73/23.31
(58) Field of Classification Search ............ 73/23.2, 73/23.21, 23.31–23.33, 31.01, 31.05
See application file for complete search history.

(56) References Cited

U.S. PATENT DOCUMENTS

| | | | |
|---|---|---|---|
| 5,323,635 A * | 6/1994 | Ueno et al. .................. 73/23.32 |
| 6,739,177 B2 * | 5/2004 | Sato et al. ................... 73/23.31 |
| 6,931,838 B2 * | 8/2005 | Kawamura ..................... 60/276 |
| 6,941,745 B2 * | 9/2005 | Ikemoto et al. ................ 60/285 |
| 6,973,926 B2 * | 12/2005 | Ohkuma ........................ 123/697 |
| 7,059,112 B2 * | 6/2006 | Bidner et al. .................. 60/277 |
| 7,721,591 B2 * | 5/2010 | Maegawa ................... 73/114.72 |
| 7,950,222 B2 * | 5/2011 | Hodzen ........................ 60/276 |
| 7,993,582 B2 * | 8/2011 | Haga et al. ..................... 422/62 |
| 2001/0029936 A1 * | 10/2001 | Takahashi et al. ............ 123/696 |
| 2004/0221641 A1 * | 11/2004 | Moritsugu et al. ........... 73/23.31 |
| 2007/0012086 A1 * | 1/2007 | Ikemoto et al. .............. 73/23.32 |
| 2007/0017486 A1 * | 1/2007 | Wiggins et al. .............. 123/478 |
| 2009/0000274 A1 * | 1/2009 | Stroh ............................ 60/274 |
| 2010/0024520 A1 * | 2/2010 | Sawada et al. ............... 73/23.31 |
| 2010/0154509 A1 * | 6/2010 | Asano et al. ................. 73/23.32 |
| 2010/0186491 A1 | 7/2010 | Shibata et al. |
| 2010/0191444 A1 * | 7/2010 | Aoki ............................ 701/109 |

FOREIGN PATENT DOCUMENTS

| | | |
|---|---|---|
| DE | 102010029512.4 | 5/2010 |
| JP | 10-196437 | 7/1998 |
| JP | 2002-195025 | 7/2002 |

(Continued)

OTHER PUBLICATIONS

U.S. Appl. No. 12/789,723, Umehara, filed May 28, 2010.

(Continued)

*Primary Examiner* — David Rogers
(74) *Attorney, Agent, or Firm* — Nixon & Vanderhye PC (57) ABSTRACT

An actual intake air quantity at the time when the intake air quantity is changed compulsorily with an EGR valve is measured with an airflow meter. An oxygen concentration of exhaust gas after combustion in a diesel engine is estimated based on the measured actual intake air quantity and a fuel injection quantity of the diesel engine. The estimated oxygen concentration is compared with an actual oxygen concentration sensed with an A/F sensor, thereby sensing response of the A/F sensor. Even if a response time for causing a change in the intake air quantity with the EGR valve changes, the change of the response time does not affect the estimate of the oxygen concentration since the oxygen concentration is estimated based on the actual intake air quantity. Therefore, the response of the A/F sensor can be sensed with high accuracy.

15 Claims, 6 Drawing Sheets

FOREIGN PATENT DOCUMENTS

| | | |
|---|---|---|
| JP | 2005-30358 | 2/2005 |
| JP | 2007-309103 | 11/2007 |
| JP | 2008-298029 | 12/2008 |
| JP | P2009-002280 A | 1/2009 |

OTHER PUBLICATIONS

Japanese Office Action dated Apr. 19, 2011, issued in corresponding Japanese Application No. 2009-168128 with English Translation.

* cited by examiner

RESPONSE SENSING DEVICE OF EXHAUST GAS COMPONENT CONCENTRATION SENSOR

CROSS REFERENCE TO RELATED APPLICATION

This application is based on and incorporates herein by reference Japanese Patent Application No. 2009-168128 filed on Jul. 16, 2009.

BACKGROUND OF THE INVENTION

1. Field of the Invention

The present invention relates to a response sensing device that senses response of an exhaust gas component concentration sensor, which senses a component concentration of exhaust gas of a diesel engine, for degradation determination of the exhaust gas component concentration sensor.

2. Description of Related Art

There is a device described in Patent document 1 (JP-A-2007-309103) known as a device that performs degradation determination of an exhaust gas component concentration sensor such as an oxygen concentration sensor provided in an exhaust system of an internal combustion engine.

The device described in Patent document 1 performs fuel cut for cutting fuel supply to the engine in order to perform the degradation determination of a response characteristic of the oxygen concentration sensor. The device calculates a reference estimation NG sensor output used for the degradation determination by using an output voltage of the oxygen concentration sensor at the time when the output voltage decreases from the output voltage as of start of the fuel cut operation by a predetermined voltage. It is determined that the oxygen concentration sensor has degraded if the actually sensed output of the oxygen concentration sensor indicates an air-fuel ratio richer than the reference estimation NG sensor output.

As mentioned above, for the degradation determination of the exhaust gas component concentration sensor in a gasoline engine, the fuel cut is performed to change a fuel injection quantity stepwise. Whether the response of the oxygen concentration sensor is good or bad is diagnosed based on the output change of the oxygen concentration sensor at the time.

However, it is not desirable to perform response diagnosis of an exhaust gas component concentration sensor such as an oxygen concentration sensor of a diesel engine by using a method similar to the method of the gasoline engine. It is because a rotation fluctuation or torque change occurs in the diesel engine immediately when the fuel injection quantity is changed stepwise in the diesel engine.

In order to solve such the problem, differently from the gasoline engine, an intake air quantity of the diesel engine may be changed and the response of the exhaust gas component concentration sensor of the diesel engine may be sensed from an output change of the exhaust gas component concentration sensor at the time.

However, when an intake actuator such as a throttle valve or an EGR valve is used as a means for changing the intake air quantity of the diesel engine, there is a possibility that a response time necessary for causing the change in the intake air quantity varies due to a variation among the individual intake actuators or aging degradation of the intake actuator.

Change in the response time, which is necessary for causing the change in the intake air quantity with the intake actuator, affects speed of occurrence of change in an exhaust gas component. Therefore, even when lowering of the response of the exhaust gas component concentration sensor is detected, it is quite difficult to distinguish whether the cause of the lowering is the change in the response time of the intake actuator or just the lowering of the response of the exhaust gas component concentration sensor.

SUMMARY OF THE INVENTION

It is an object of the present invention to provide a response sensing device of an exhaust gas component concentration sensor capable of accurately sensing response of the exhaust gas component concentration sensor by compulsorily changing an intake air quantity in a diesel engine.

According to a first example aspect of the present invention, a response sensing device of an exhaust gas component concentration sensor has an intake air quantity measuring section, an intake air quantity changing section, an exhaust gas component concentration estimating section, an exhaust gas component concentration sensor, and a response sensing section.

The intake air quantity measuring section is provided to an intake pipe of a diesel engine and measures an intake air quantity introduced into the diesel engine.

The intake air quantity changing section changes the intake air quantity of the diesel engine.

The exhaust gas component concentration estimating section estimates a component concentration of exhaust gas after combustion in the diesel engine at least based on the measured actual intake air quantity and a fuel injection quantity injected and supplied to the diesel engine.

The exhaust gas component concentration sensor is provided to an exhaust pipe of the diesel engine and senses an actual component concentration of the exhaust gas of the diesel engine.

The response sensing section senses response of the exhaust gas component concentration sensor by comparing the exhaust gas component concentration estimated by the exhaust gas component concentration estimating section and the actual exhaust gas component concentration sensed by the exhaust gas component concentration sensor when compulsorily changing the intake air quantity with the intake air quantity changing section.

The response sensing device according to the above-described aspect of the present invention measures the actual intake air quantity with the intake air quantity measuring section when the intake air quantity is changed compulsorily with the intake air quantity changing section. Then, the response sensing device estimates the component concentration of the exhaust gas after the combustion in the diesel engine based on the measured actual intake air quantity and the fuel injection quantity of the diesel engine. The estimated exhaust gas component concentration is compared with the actual exhaust gas component concentration sensed with the exhaust gas component concentration sensor. Thus, the response of the exhaust gas component concentration sensor is sensed. In this way, the exhaust gas component concentration is estimated based on the actual intake air quantity. Therefore, even if a response time for causing a change in the intake air quantity with the intake air quantity changing section changes, the change of the response time does not affect the estimate of the exhaust gas component concentration. Accordingly, the response of the exhaust gas component concentration sensor can be sensed with high accuracy.

According to a second example aspect of the present invention, the response sensing section senses the response of the exhaust gas component concentration sensor while the diesel engine is idling. It is because, even if the stepwise change of the intake air quantity occurs, an influence of the stepwise change on a vehicle behavior can be suppressed to the minimum during the idling. That is, if a transmission of the vehicle is a manual transmission, a clutch is disengaged when the diesel engine is idling. If the transmission of the vehicle is an automatic transmission, at least lockup is cancelled when the diesel engine is idling. In such the states, at least the diesel engine is not mechanically linked with a drive shaft. Accordingly, even when fluctuation is caused in engine rotation speed of the diesel engine by the stepwise change of the intake air quantity, an influence of the fluctuation on the vehicle behavior can be inhibited regardless of the type of the transmission.

According to a third example aspect of the present invention, the exhaust gas component concentration estimating section calculates at least one of a normal estimate, which follows a characteristic of the exhaust gas component concentration sensor having normal response, and a degradation estimate, which follows a characteristic of the exhaust gas component concentration sensor having degraded response, as the estimate of the exhaust gas component concentration. It is because the degradation degree of the response of the exhaust gas component concentration sensor can be sensed by using any of the normal estimate, which follows the normal characteristic, and the degradation estimate, which follows the characteristic having the degraded response. Furthermore, for example, by calculating both of the estimates and by calculating a ratio between differences between the actual sensing value of the exhaust gas component concentration and the both estimates, the response of the exhaust gas component concentration sensor can be sensed with higher accuracy.

According to a fourth example aspect of the present invention, a response time of the degradation estimate, which follows the characteristic of the exhaust gas component concentration sensor having the degraded response, lengthens as flow velocity of the exhaust gas decreases as compared to the normal estimate, which follows the characteristic of the exhaust gas component concentration sensor having the normal response. It is because the exhaust gas component concentration sensor shows such the characteristic when the response of the exhaust gas component concentration sensor degrades.

According to a fifth example aspect of the present invention, the exhaust gas component concentration estimating section calculates the exhaust gas component concentration at a position of a cylinder of the diesel engine first and then calculates the estimate of the exhaust gas component concentration, which is to be compared with the actual exhaust gas component concentration sensed with the exhaust gas component concentration sensor, in consideration of a delay until the exhaust gas component concentration calculated as the concentration at the position of the cylinder is sensed with the exhaust gas component concentration sensor.

A time for the exhaust gas after the combustion of the fuel injected into the cylinder of the diesel engine to reach the exhaust gas component concentration sensor provided in the exhaust pipe changes with an installation position of the exhaust gas component concentration sensor, flow velocity of the exhaust gas and the like. Therefore, the accuracy of the estimate of the exhaust gas component concentration can be further increased by taking into account the delay until the exhaust gas from the cylinder reaches the exhaust gas component concentration sensor and is sensed as in the above aspect of the present invention.

According to a sixth example aspect of the present invention, the exhaust gas component concentration estimating section has a map beforehand storing a relationship between the exhaust gas component concentration and at least the intake air quantity and the fuel injection quantity. The exhaust gas component concentration estimating section estimates the exhaust gas component concentration using the map. Although the estimate of the exhaust gas component concentration can be calculated by substituting the intake air quantity and the fuel injection quantity into a predetermined calculation formula, the estimate of the exhaust gas component concentration can be calculated more easily by using the above-described map.

According to a seventh example aspect of the present invention, the response sensing section changes the intake air quantity stepwise with the intake air quantity changing section such that change in the intake air quantity becomes equal to or larger than a predetermined amount. When the intake air quantity is changed stepwise in this way, the sensing value of the exhaust gas component concentration sensor changes mainly in accordance with the intake air quantity. Accordingly, even when the sensing value of the exhaust gas component concentration sensor changes due to other causes, an influence of the other causes is small and substantially negligible. Therefore, the error causes can be eliminated and the accuracy of the sensing of the response of the exhaust gas component concentration sensor can be improved.

According to an eighth example aspect of the present invention, the response sensing device further has an injection quantity controlling section for controlling the fuel injection quantity such that rotation speed of the diesel engine remains constant before and after the change of the intake air quantity when the intake air quantity is changed stepwise with the intake air quantity changing section. By performing such the fuel injection quantity control, the rotation fluctuation of the diesel engine can be inhibited despite the stepwise change of the intake air quantity.

According to a ninth example aspect of the present invention, the response sensing section gradually controls the intake air quantity changing section until the intake air quantity changing section reaches a predetermined set state such that the intake air quantity decreases gradually and confirms whether an abnormality occurs in the diesel engine at that time before changing the intake air quantity stepwise with the intake air quantity changing section. When it is confirmed that the abnormality does not occur, the response sensing section uses the set state as an initial state or an end state of the intake air quantity changing section at the time when the intake air quantity is changed stepwise.

When the intake air quantity is increased stepwise, the intake air quantity is increased stepwise from the initial state, in which the intake air quantity is decreased to the minimum in a range where the diesel engine can maintain the operation state. When the intake air quantity is decreased stepwise, the intake air quantity is decreased stepwise to the end state, in which the intake air quantity is decreased to the minimum in the range where the diesel engine can maintain the operation state. Thus, excessive increase of the rotation of the diesel engine accompanying the stepwise change of the intake air quantity can be prevented. However, in the state where the intake air quantity is decreased to the minimum, the fuel quantity capable of combusting in the cylinder decreases and combustion timing of the fuel delays. Accordingly, the engine becomes apt to cause a misfire. Therefore, in such the state, it is anticipated that the abnormality such as the misfire can be caused in the diesel engine even by a small error in the intake air quantity. Therefore, it is preferable to confirm whether the abnormality occurs in the diesel engine when the intake air quantity changing section is controlled to the predetermined set state before the intake air quantity is changed stepwise with the intake air quantity changing section as described above.

According to a tenth example aspect of the present invention, the response sensing device further has an injection quantity controlling section for controlling the fuel injection quantity such that rotation speed of the diesel engine remains constant regardless of decrease of the intake air quantity when the intake air quantity changing section is controlled gradually until the intake air quantity changing section reaches the predetermined set state such that the intake air quantity decreases gradually. Thus, the rotation fluctuation of the diesel engine can be suppressed to the minimum even when the intake air quantity decreases.

According to an eleventh example aspect of the present invention, the response sensing section determines that the abnormality has occurred in the diesel engine if the fuel injection quantity increases to a predetermined injection quantity or over or if the actual intake air quantity decreases to a predetermined air quantity or under when the intake air quantity changing section is gradually controlled until the intake air quantity changing section reaches the predetermined set state. It is because the maintenance of the rotation of the diesel engine can become difficult when either one of the above-described conditions is detected.

According to a twelfth example aspect of the present invention, the response sensing section gradually controls the intake air quantity changing section until the intake air quantity changing section reaches a predetermined set state such that the intake air quantity decreases gradually before changing the intake air quantity stepwise with the intake air quantity changing section. When the actual intake air quantity decreases to a predetermined air quantity or under or the fuel injection quantity increases to a predetermined injection quantity or over during the gradual control, the response sensing section changes the set state based on a state of the intake air quantity changing section at the time.

Thus, for example, even if the adjusted intake air quantity includes an error due to a variation among the individual intake air quantity changing sections, the state of the intake air quantity changing section in the range where the diesel engine can maintain the operation state can be used as the set state, which is used as the initial state or the end state at the time when the intake air quantity is changed stepwise.

According to a thirteenth example aspect of the present invention, the response sensing section further controls the intake air quantity changing section to decrease the intake air quantity if the actual intake air quantity does not decrease to the predetermined air quantity or under or if the fuel injection quantity does not increase to the predetermined injection quantity or over even when the intake air quantity changing section reaches the set state. The response sensing section changes the set state based on a state of the intake air quantity changing section at the time when the actual intake air quantity becomes equal to or smaller than the predetermined air quantity or when the fuel injection quantity becomes equal to or larger than the predetermined injection quantity.

There is also a case where the error in the intake air quantity due to the variation among the individual intake air quantity changing sections and the like increases the intake air quantity. In such the case, the intake air quantity cannot be fully reduced only by controlling the intake air quantity changing section to the set state. Therefore, the above-described aspect of the present invention is effective.

According to a fourteenth example aspect of the present invention, the exhaust gas component concentration estimating section calculates a calibration value for calibrating the estimate of the exhaust gas component concentration when an operation state of the diesel engine is constant and there occurs a difference between the estimate of the exhaust gas component concentration and the actual exhaust gas component concentration sensed with the exhaust gas component concentration sensor.

According to a fifteenth example aspect of the present invention, the exhaust gas component concentration estimating section performs the calculation of the calibration value of the estimate of the exhaust gas component concentration before the response of the exhaust gas component concentration sensor is sensed.

Thus, even when a deviation occurs between the estimate of the exhaust gas component concentration and the actual exhaust gas component concentration, the deviation can be cancelled. Therefore, the response of the exhaust gas component concentration sensor can be sensed with high accuracy by comparing the estimate of the exhaust gas component concentration and the actual exhaust gas component concentration.

According to a sixteenth example aspect of the present invention, the response sensing device further has an abnormality detecting section for detecting an abnormality in the intake air quantity measuring section. The sensing of the response of the exhaust gas component concentration sensor is prohibited when the abnormality in the intake air quantity measuring section is detected by the abnormality detecting section.

For example, when the intake air quantity measuring section cannot operate normally, the estimate of the exhaust gas component concentration cannot be calculated correctly. As a result, the response of the exhaust gas component concentration sensor cannot be sensed correctly. Therefore, it is desirable not to perform the sensing of the response of the exhaust gas component concentration sensor when the abnormality in the intake air quantity measuring section is detected.

According to a seventeenth example aspect of the present invention, the abnormality detecting section detects that the intake air quantity measuring section is abnormal when the response sensing section detects that the exhaust gas component concentration sensor has response quicker than a predetermined standard response.

The exhaust gas component concentration sensor cannot indicate the response quicker than a range of the response in an initial state. Therefore, there can be a high possibility that the abnormality has occurred in the intake air quantity measuring section when it is detected that the exhaust gas component concentration sensor has such the quick response.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

First Embodiment

Hereafter, a response sensing device of an exhaust gas component concentration sensor according to an embodiment of the present invention will be explained with reference to drawings. In the present embodiment, an air-fuel ratio (A/F) sensor is applied as an exhaust gas component concentration sensor of a diesel engine, and response diagnosis is performed by sensing response of the A/F sensor.

Figure 1:
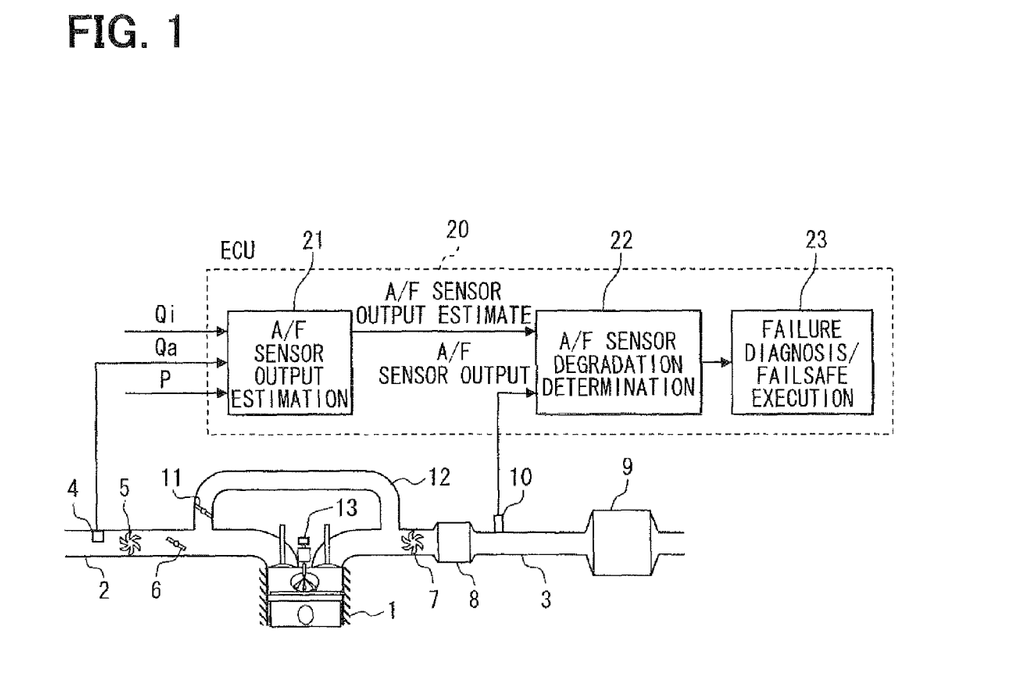
FIG. 1 is a schematic diagram showing an entire construction of a response sensing device of an exhaust gas component concentration sensor according to an embodiment of the present invention.

In the diesel engine of FIG. 1, an intake pipe 2 for passing an intake air and an exhaust pipe 3 for passing an exhaust gas discharged from cylinders of an engine main body 1 are connected to the engine main body 1.

An air cleaner (not shown) is provided in an end of the intake pipe 2. An airflow meter 4, a compressor 5 of a turbocharger and a throttle valve 6 are provided in the intake pipe 2.

The airflow meter 4 senses an intake air quantity of fresh air (referred to also as intake quantity Qa, hereafter) flowing into the intake pipe 2 through the air cleaner and outputs a sensing signal to an ECU 20. The ECU 20 consists of a digital computer and has publicly known constructions such as ROM, RAM, CPU, an input port and an output port mutually connected by a bi-directional bus/buses. The ECU 20 performs degradation diagnosis of an A/F sensor 10. The ECU 20 may control operation states of the diesel engine such as a fuel injection quantity Qi and injection timing. Alternatively, another ECU may control the diesel engine and perform two-way communication of necessary information with the ECU 20.

Injectors 13 as fuel injection valves are provided to respective cylinders of the engine main body 1. Fuel (light oil) is injected from each injector 13 into a combustion chamber of each cylinder. The fuel is drawn from a fuel tank (not shown) and pressurized by a fuel pump. Then, the fuel is supplied to the injectors 13 via a common rail.

A turbine 7 of the turbocharger is provided in the exhaust pipe 3, into which the exhaust gas generated in the combustion chambers of the respective cylinders of the engine main body 1 is discharged. The turbine 7 is rotated by the exhaust gas and drives the compressor 5 linked with the turbine 7, thereby supercharging the intake air.

The exhaust gas is emitted to an atmosphere through a muffler (not shown) provided in an end of the exhaust pipe 3 via the turbine 7. A diesel oxidation catalyst 8 (DOC) for purifying harmful components of the exhaust gas, the A/F sensor 10 for sensing an oxygen concentration of the exhaust gas and a particulate filter 9 (DPF) are provided in the exhaust pipe 3.

A sensing signal of the A/F sensor 10 is used to control the air-fuel ratio during the combustion in the respective cylinders of the diesel engine. In addition, the sensing signal is used to sense the response of the A/F sensor 10. The sensing signal is inputted to the ECU 20. The A/F sensor 10 may be provided upstream of the DOC 8 or may be provided downstream of the DPF 9.

The DPF 9 consists of a porous ceramic body such as a cordierite or a silicon carbide. The exhaust gas flowing into the DPF 9 via an inlet of the DPF 9 permeates through porous partition walls and flows downstream via an outlet of the DPF 9. At that time, exhaust particulate matters (particulates) contained in the exhaust gas are collected and accumulated in the DPF 9 with an elapse of operation time. An oxidation catalyst containing a precious metal such as the platinum or the palladium as a main component is supported on a surface of a filter main body of the DPF 9. The oxidation catalyst oxidizes, combusts and eliminates the exhaust particulate matters under a predetermined temperature condition.

An end of an exhaust gas recirculation pipe 12 (referred to as EGR pipe, hereafter), which is for recirculating a part of the exhaust gas (EGR gas) to an intake system, is connected to the exhaust pipe 3. The other end of the EGR pipe 12 is connected to the intake pipe 2. An EGR valve 11 and an EGR cooler (not shown) are provided in the EGR pipe 12. The EGR cooler performs heat exchange between the EGR gas and an engine coolant in order to reduce temperature of the EGR gas. An opening degree of the EGR valve 11 is controlled in accordance with an operation state of the engine main body 1. Thus, the EGR valve 11 adjusts an EGR rate, which is a rate of the EGR gas introduced into the cylinder.

In the present embodiment, the above-described EGR valve 11 is used as an intake actuator that changes the intake quantity Qa stepwise in response sensing processing of the A/F sensor 10 mentioned later. The intake actuator is not limited to the EGR valve 11. For example, in a case where the throttle valve 6 is an unlinked throttle, which is not mechanically linked with an accelerator and which can freely control its opening degree, the throttle valve 6 may be used as the intake actuator. Alternatively, a variable nozzle turbocharger, which can adjust supercharging pressure P by controlling a vane angle of the turbine 7 on the exhaust gas side, may be employed and may be used as the intake actuator. It is because the intake quantity Qa can be changed by changing the supercharging pressure P.

Signals from an accelerator position sensor and a crank angle sensor (not shown) are inputted to the ECU that controls the operation state of the diesel engine. The ECU calculates an engine load based on the output signal of the accelerator position sensor. The ECU calculates engine rotation speed based on an output pulse from the crank angle sensor. The ECU senses the operation state of the diesel engine based on the engine load and the engine rotation speed in addition to the above-mentioned intake quantity Qa and the oxygen concentration in the exhaust gas. The ECU controls valve opening timing and a valve opening period of the injector 13 and controls the EGR rate in accordance with the operation state.

There is a case where the sensing response of the oxygen concentration of the A/F sensor 10 provided in the exhaust pipe 3 lowers due to adhesion of the particulate matters to the A/F sensor 10, aging degradation of a sensor element of the A/F sensor 10 and the like. When the sensing response of the A/F sensor 10 lowers in this way, it becomes difficult to appropriately control the diesel engine based on the sensing signal of the A/F sensor 10. Therefore, in the present embodiment, the intake quantity Qa of the fresh air is changed stepwise by using the EGR valve 11, whereby the sensing value of the A/F sensor 10 is changed compulsorily. At the same time, the oxygen concentration to be sensed with the A/F sensor 10 is estimated with an A/F sensor output estimation section 21 of the ECU 20. An A/F sensor degradation determination section 22 compares the estimate of the oxygen concentration to be sensed with the A/F sensor 10 and the sensing value actually sensed with the A/F sensor 10. Thus, the response of the A/F sensor 10 is sensed, and it is determined whether the sensed response has lowered. When the response has lowered, a failure diagnosis/failsafe execution section 23 performs predetermined failsafe processing.

Figure 2:
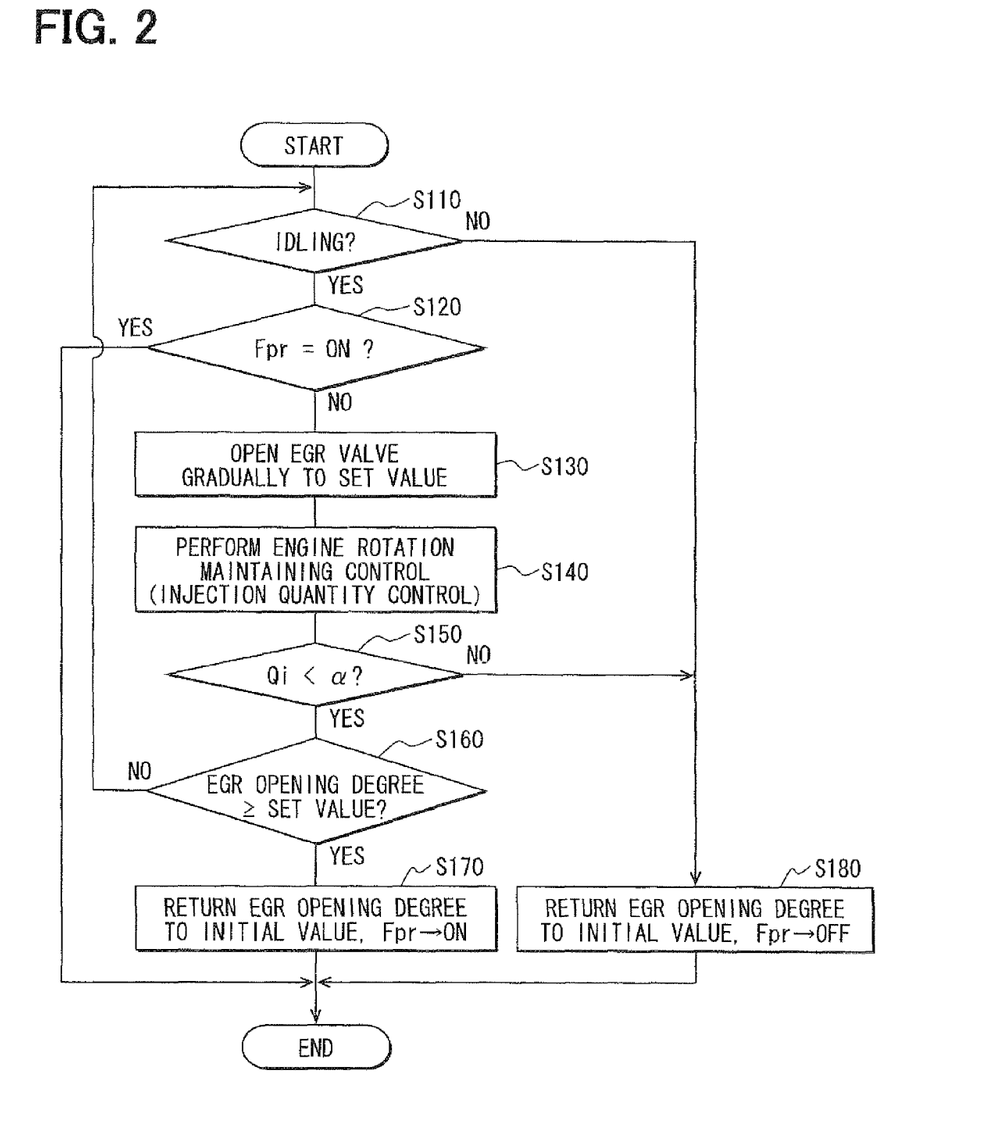
FIG. 2 is a flowchart showing preparation processing for response sensing of the exhaust gas component concentration sensor according to the embodiment.

Hereafter, the above-mentioned response sensing processing of the A/F sensor 10 will be explained based on flowcharts of FIGS. 2 and 3. First, the processing for preparing for the response sensing will be explained based on the flowchart of FIG. 2.

First in S110 (S means "Step"), it is determined whether the diesel engine is idling. In the present embodiment, the response sensing processing is performed while the diesel engine is idling as mentioned later. Thus, even when the intake quantity Qa of the fresh air is changed stepwise in the response sensing processing, an influence of the stepwise change on a vehicle behavior is suppressed to the minimum, if a transmission of the vehicle is a manual transmission, a clutch is disengaged when the diesel engine is idling. If the transmission is an automatic transmission, at least lockup is canceled when the diesel engine is idling. In such the states, at least the diesel engine is not linked mechanically with a drive shaft. Therefore, even if fluctuation is caused in the engine rotation speed of the diesel engine by the stepwise change of the intake quantity Qa, an influence of the fluctuation on the vehicle behavior can be inhibited regardless of the type of the transmission. In the preparation processing of the response sensing (described in more detail later), it is confirmed whether the diesel engine can operate without causing an abnormality such as a misfire at a set opening degree of the EGR valve 11 or over. The set opening degree is used as an initial opening degree (or end opening degree) of the EGR valve 11 at the time when the stepwise change of the intake quantity Qa is caused in the response sensing. Such the confirmation requires that the diesel engine is idling as a prerequisite as in the response sensing processing. Therefore, the above-mentioned determination processing is performed.

If it is determined in S110 that the diesel engine is idling, the process proceeds to processing of S120. In S120, it is determined whether it has been already confirmed that the abnormality does not occur at the set opening degree of the EGR valve 11 or over and a response diagnosis preparation completion flag Fpr has been set at ON. When the response diagnosis preparation completion flag Fpr is not ON, i.e., when the response diagnosis preparation completion flag Fpr is set at OFF, the process proceeds to S130. When the response diagnosis preparation completion flag Fpr is ON, the processing shown in the flowchart of FIG. 2 is ended as it is.

In S130, control for gradually increasing the opening degree of the EGR valve 11 is started to achieve the set opening degree of the EGR valve 11. As a result, the rate of the exhaust gas introduced into the engine main body 1 increases, so the intake quantity Qa of the fresh air decreases gradually conversely. In following S140, injection quantity control is performed to maintain the engine rotation speed. That is, the injection quantity control for increasing the injection quantity Qi is performed such that the rotation speed does not decrease excessively even if the intake quantity Qa of the fresh air decreases. Thus, the rotation fluctuation of the diesel engine can be inhibited even though the intake quantity Qa of the fresh air decreases.

In S150, it is determined whether the injection quantity Qi increased in S140 is still smaller than a predetermined value α. When the injection quantity Qi becomes equal to or larger than the predetermined value α as the result of the injection quantity control in S140, there is a possibility that the abnormality such as the misfire occurs in the diesel engine. Therefore, when the determination result of S150 is "NO" the process proceeds to processing of S180. In S180, the control for increasing the opening degree of the EGR valve 11 is stopped at the time point, and the opening degree of the EGR valve 11 is returned to the initial value. In this case, the response diagnosis preparation completion flag Fpr is maintained at OFF. When the determination result of S150 is "NO," the occurrence of the engine abnormality caused when the control for increasing the opening degree of the EGR valve 11 to the set opening degree was performed may be stored, and the abnormality may be announced.

When the determination result of S150 is "YES," the process proceeds to S160, in which it is determined whether the opening degree of the EGR valve 11 is equal to or larger than the set opening degree. If the opening degree is still smaller than the set opening degree, the process returns to the processing of S110, and the processing from S110 to S150 is repeated until the opening degree becomes equal to or larger than the set opening degree. When the opening degree becomes equal to or larger than the set opening degree, it is confirmed that the opening degree of the EGR valve 11 can be increased to the set opening degree or over without causing the abnormality in the diesel engine. Therefore, the process proceeds to proceeding of S170, in which the opening degree of the EGR valve 11 is returned to the initial value, and the response diagnosis preparation completion flag Fpr is set at ON.

In S150, it is regarded that the abnormality has occurred in the diesel engine when the fuel injection quantity Qi increases to the predetermined value α or over. Alternatively, it may be regarded that an abnormality has occurred in the diesel engine when the intake quantity Qa of the fresh air sensed with the airflow meter 4 becomes equal to or smaller than a predetermined value. It is because maintenance of the rotation of the diesel engine can become difficult when either one of the above-described conditions is detected.

Next, the response sensing processing of the A/F sensor 10 according to the present embodiment will be explained based on the flowchart of FIG. 3.

In S210, it is determined whether the diesel engine is idling. If the diesel engine is idling, the process proceeds to processing of S220. If the diesel engine is not idling, the process proceeds to processing of S270, in which the response diagnosis preparation completion flag Fpr is set at OFF. Therefore, the processing is performed again from the preparation processing of the response sensing if the operation state of the diesel engine goes out of the idling state after the preparation processing of the response sensing is performed and before the response sensing processing is performed. In S210, it may be determined whether the diesel engine is idling based on the engine rotation speed. Alternatively, continuation or an end of the idling may be determined based on an operation of the accelerator or a clutch pedal or based on a gear position of the transmission.

In S220, it is determined whether the response diagnosis preparation completion flag Fpr is set at ON. When the response diagnosis preparation completion flag Fpr is not ON, the processing shown in the flowchart of FIG. 3 is ended. When the response diagnosis preparation completion flag Fpr is ON, the process proceeds to processing of S230, in which an opening degree command value of the EGR valve 11 is set at the set opening degree first. At that time, as explained concerning S140 of the flowchart of FIG. 2, the fuel injection quantity control is performed to maintain the diesel engine rotation speed. Thus, the opening degree of the EGR valve 11 increases to the set opening degree as shown in FIG. 4. Accordingly, the intake quantity Qa of the fresh air decreases and eventually the output of the A/F sensor 10 becomes a value on a rich side. In the state where the intake quantity Qa is decreased in this way, the fuel quantity capable of combusting in the cylinder of the engine main body 1 decreases and combustion timing of the fuel delays. Accordingly, the engine becomes apt to cause the misfire. Therefore, in such the state, it is anticipated that the abnormality such as the misfire can be caused in the diesel engine even by a small error in the intake quantity Qa adjusted by the EGR valve 11. Regarding this point, in the present embodiment, it has been already confirmed that the abnormality does not occur in the diesel engine when the EGR valve 11 is brought to the set opening degree by the preparation processing of the response sensing. Therefore, the diesel engine can be operated normally even if the intake quantity Qa decreases.

In FIG. 4, solid lines "NORMAL" show the response characteristics of the EGR valve opening degree and the intake quantity Qa in the case where the EGR valve 11 has the normal response. Broken lines "DEGRADED" show the response characteristics of the EGR valve opening degree and the intake quantity Qa in the case where the EGR valve 11 has the degraded response. A solid line "a" shows the sensor output of the A/F sensor 10 in the case where the EGR valve 11 has the normal response, and a solid line "a'" shows the sensor output of the A/F sensor 10 in the case where the EGR valve 11 has the degraded response.

If a predetermined time necessary for stabilization of the output of the A/F sensor 10 elapses after the opening degree of the EGR valve 11 is brought to the set opening degree, the opening degree command value is changed stepwise such that the opening degree of the EGR valve 11 changes from the set opening degree to zero. Also in this case, the fuel injection quantity control is performed to maintain the diesel engine rotation speed.

Accordingly, the opening degree of the EGR valve 11 changes from the set opening degree to zero in accordance with a response characteristic specific to the EGR valve 11. As a result, the intake quantity Qa of the fresh air changes largely and stepwise as shown in FIG. 4. Accordingly, the oxygen concentration sensed with the A/F sensor 10 also changes largely to a value on a lean side. In this way, by changing the intake quantity Qa stepwise, the sensing value of the A/F sensor 10 changes mainly in accordance with the change of the intake quantity Qa. That is, even when the sensing value of the A/F sensor 10 changes due to other causes, an influence of the other causes is small and substantially negligible. Thus, the error causes can be eliminated, and the sensing accuracy of the response of the A/F sensor 10 can be improved.

The response characteristic of the EGR valve 11 changes with a variation among the individual EGR valves 11 or an aging degradation of the EGR valve 11. As shown in FIG. 4, a large difference arises in a response time, in which the valve opening degree changes from the set opening degree to zero, i.e., a response time necessary for the stepwise change of the intake quantity Qa to complete, between the normal EGR valve 11 (solid lines NORMAL) and the EGR valve 11 having the degraded response (broken lines DEGRADED). As shown in FIG. 4 (solid lines a, a'), the change in the response time of the EGR valve 11 affects speed of the change in the oxygen concentration of the exhaust gas sensed with the A/F sensor 10.

Therefore, in the present embodiment, an estimate of the oxygen concentration to be compared with the sensing value of the A/F sensor 10 is calculated based on the actual intake quantity Qa sensed with the airflow meter 4 as explained below. Thus, even if the response time of the EGR valve 11 changes as shown in FIG. 4, the influence of the change of the response time can be prevented from affecting the estimate of the oxygen concentration. Accordingly, the response of the A/F sensor 10 can be sensed with high accuracy.

First in S240, the actual oxygen concentration in the exhaust gas is measured with the A/F sensor 10. In addition, the estimate of the oxygen concentration to be compared with the oxygen concentration in the exhaust gas measured with the A/F sensor 10 is calculated as follows.

First, the actual intake quantity Qa at the time when the intake quantity Qa is changed stepwise with the EGR valve 11 is measured with the airflow meter 4. Then, the oxygen concentration of the exhaust gas after the combustion in the diesel engine is estimated at least based on the measured actual intake quantity Qa and the fuel injection quantity Qi of the diesel engine. If the diesel engine has the turbo mechanism as in the present embodiment, it is desirable to take the supercharging pressure P into account when the oxygen concentration in the exhaust gas is estimated. The oxygen concentration can be estimated more accurately by taking the EGR rate and a gas composition of the EGR gas into account.

More detailed explanation about the estimation of the oxygen concentration based on the actual intake quantity Qa and the fuel injection quantity Qi will be given below. A time necessary for the fresh air sensed with the airflow meter 4 to reach the combustion chamber of the cylinder of the engine main body 1 is estimated based on flow velocity of the intake air and the engine rotation speed. The oxygen concentration in the exhaust gas after the combustion in the combustion chamber of the cylinder is estimated based on the intake quantity Qa, which is sensed at a time earlier than the present time by the estimated time, and the fuel injection quantity Qi injected into the combustion chamber. The estimate of the oxygen concentration may be calculated by substituting the intake quantity Qa and the fuel injection quantity Qi into a predetermined calculation formula. Alternatively, the oxygen concentration may be estimated by using a map beforehand storing a relationship of the oxygen concentration with respect to the intake quantity Qa and the fuel injection quantity Qi. The estimate of the oxygen concentration can be calculated easily by using such the map.

The estimate of the oxygen concentration is calculated further by taking a delay until the exhaust gas is sensed with the A/F sensor 10 into account. It is because the time necessary for the exhaust gas after the combustion of the fuel injected into the cylinder of the diesel engine to reach the A/F sensor 10 provided in the exhaust pipe 3 changes in accordance with an installation position of the A/F sensor 10, flow velocity of the exhaust gas corresponding to the engine rotation speed, and the like.

At least one of a normal estimate, which follows a characteristic of the A/F sensor 10 having the normal response, and a degradation estimate, which follows a characteristic of the A/F sensor 10 having the degraded response, is calculated as the estimate of the oxygen concentration. In FIG. 4, a chained line "b" shows a normal estimate in the case where the EGR valve 11 has the normal response, a chained line "b'" shows another normal estimate in the case where the EGR valve 11 has the degraded response, and a chain double-dashed line "c" shows a degradation estimate in the case where the EGR valve 11 has the degraded response. The characteristics are beforehand stored in the NF sensor output estimation section 21 of the ECU 20. The characteristic of the A/F sensor 10 having the normal response is equivalent to an initial characteristic before the A/F sensor 10 is used. The characteristic of the A/F sensor 10 having the degraded response is set such that the response time lengthens as the flow velocity of the exhaust gas becomes slower as compared with the characteristic of the A/F sensor 10 having the normal response. It is because the A/F sensor 10 shows such the characteristic when the response of the A/F sensor 10 degrades.

The degradation of the response of the A/F sensor 10 can be detected by using any of the normal estimate following the normal characteristic and the degradation estimate following the characteristic having the degraded response. For example, if the actual sensing value of the oxygen concentration belongs to a predetermined delay range with respect to the normal estimate as shown in FIG. 4, it can be generally determined that the response of the A/F sensor 10 is in the normal range. If the actual sensing value of the oxygen concentration is not later than the degradation estimate, it may be determined that the response of the A/F sensor 10 is in the normal range.

Furthermore, by calculating both of the normal estimate and the degradation estimate such as the normal estimate (b' in FIG. 4) and the degradation estimate (c in FIG. 4) in the case where the EGR valve response has degraded as shown in FIG. 4, the response of the A/F sensor 10 can be sensed with higher accuracy from respective differences between the actual sensing value of the oxygen concentration and the both of the normal estimate and the degradation estimate, for example. For example, when a time difference between the normal estimate and the actual sensing value indicating the same value is 200 ms and a time difference between the actual sensing value and the degradation estimate indicating the same value is 200 ms, it can be determined that the response of the A/F sensor 10 is the exactly middle characteristic between the normal characteristic and the degraded characteristic.

If the normal estimate is calculated, it is also possible to determine an abnormality in the airflow meter 4 by using the normal estimate. The abnormality in the airflow meter 4 includes inability to sense the intake quantity Qa or fixation of an output to a constant value due to disconnection or a short circuit of a wiring or the like. The abnormality also includes outputting an erroneous sensing value although the sensing of the intake quantity Qa is possible. In addition, when the change of the actual sensing value of the oxygen concentration arises at earlier timing than the change in the normal estimate, there is a high possibility that the airflow meter 4 is erroneously sensing the intake quantity Qa. Therefore, when the normal estimate is used, it is also possible to detect the abnormality of erroneous sensing of the airflow meter 4. When the abnormality in the airflow meter 4 is detected, the response sensing processing of the A/F sensor 10 should be preferably suspended such that the response sensing processing is not performed. The control of the operation state of the diesel engine should be preferably performed without using the sensing value of the airflow meter 4, and an abnormality warning should be preferably performed.

In S250, the response of the A/F sensor 10 is sensed by comparing the estimate of the oxygen concentration and the actually measured sensing value of the oxygen concentration. As mentioned above, the response sensing method uses the time difference between the estimate and the sensing value indicating the same value. Alternatively, the response sensing method may use a difference between the estimate and the sensing value at the same timing or a difference between time integration values of the estimate and the sensing value from a time point when the estimate starts changing, whereby the response sensing method can sense the response of the A/F sensor 10 based on the estimate.

In S260, it is determined whether the response of the A/F sensor 10 can be regarded to be in the normal range based on the response sensing result of S250. When the response of the A/F sensor 10 exists in the normal range, the process proceeds to S270, in which the response diagnosis preparation completion flag Fpr is set at OFF. When the response of the A/F sensor 10 does not exist in the normal range but has degraded, the process proceeds to S280. In S280, the response of the A/F sensor 10 is determined to be abnormal, and the determination result is stored as abnormality information. Furthermore, failsafe processing is performed in S290. In the failsafe processing, the abnormality is reported to a driver, and an operation mode is switched to a mode for performing the engine control without using the sensing value of the A/F sensor 10. If a mechanism for burning soot adhering to the A/F sensor 10 is provided, the soot is burned.

Above is the explanation of the embodiment of the present invention. The present invention is not limited to the embodiment. The present invention can be modified and implemented as follows, for example.

Figure 5:
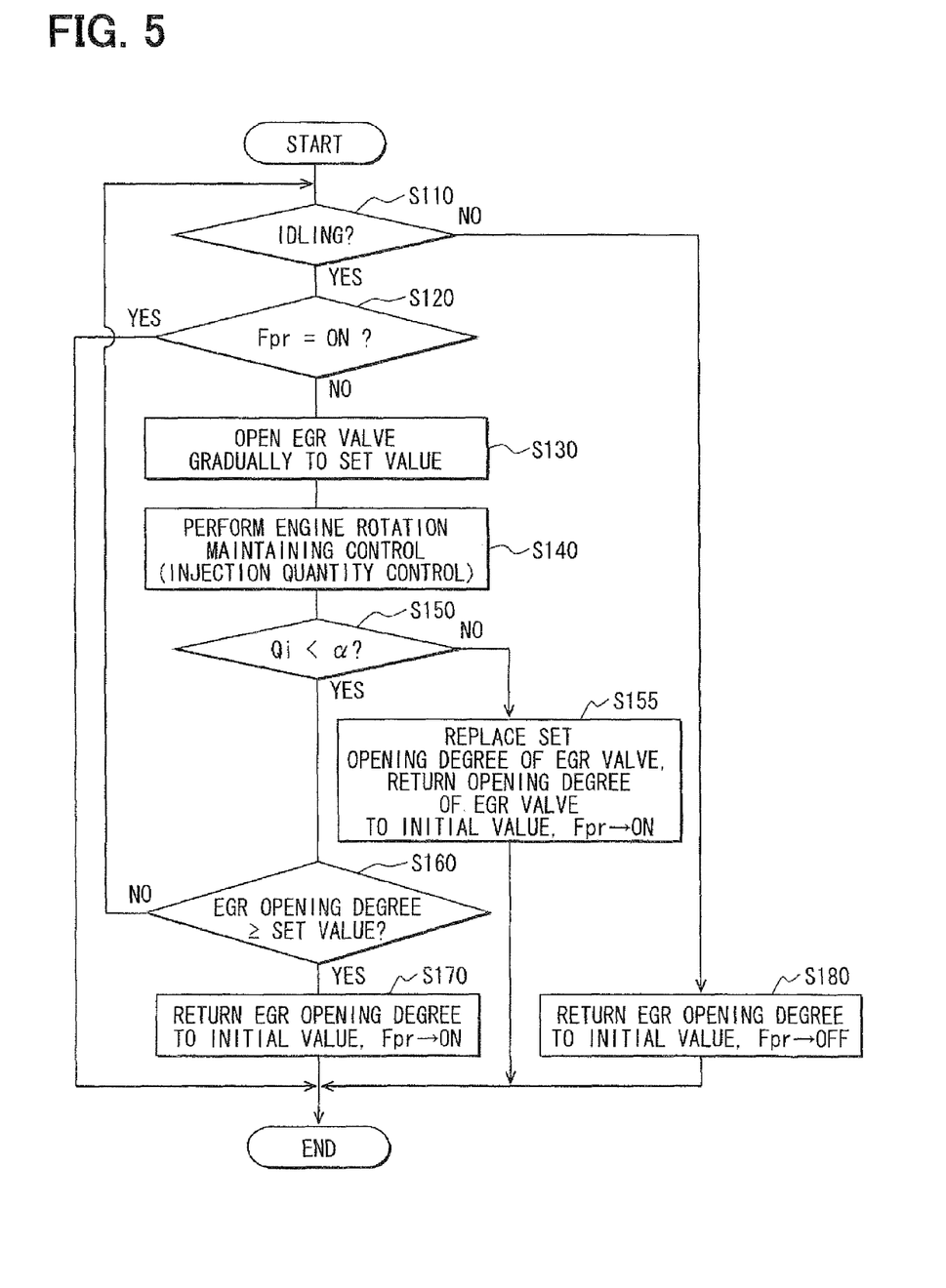
FIG. 5 is a flowchart showing preparation processing for the response sensing of the exhaust gas component concentration sensor according to a first modified example of the embodiment.

In the above-described embodiment, when it is determined in S150 that the fuel injection quantity Qi has increased to the predetermined value α or over before the opening degree of the EGR valve 11 becomes the set opening degree or over in the preparation of the response sensing, it is regarded that the abnormality has occurred in the diesel engine, and the preparation processing of the response sensing is stopped at the time point. Alternatively, when it is determined in S150 that the injection quantity Qi increased by the injection quantity control of S140 becomes equal to or larger than the predetermined value α, processing shown in S155 of a flowchart of FIG. 5 may be performed. Thus, even when it is determined that the injection quantity Qi becomes equal to or larger than the predetermined value α in S150, the response sensing of the A/F sensor 10 can be performed.

in S155 of FIG. 5, the set opening degree is replaced with the opening degree of the EGR valve 11 at the time when the injection quantity Qi coincides with the predetermined value α or at the time immediately before the injection quantity Qi coincides with the predetermined value α. With such the construction, even if the adjusted intake quantity Qa includes the error due to the variation among the individual EGR valves 11 or the like, the opening degree of EGR valve 11 in a range where the diesel engine can maintain the operation state can be used as the set opening degree of the EGR valve 11.

Alternatively, it may be regarded that an abnormality has occurred in the diesel engine in S150 when the intake quantity Qa of the fresh air sensed with the airflow meter 4 becomes equal to or smaller than another predetermined value. It is because the maintenance of the rotation of the diesel engine can become difficult also in this case.

There is also a case where the error in the intake quantity Qa due to the variation among the individual EGR valves 11 or the like increases the intake quantity Qa. In such the case, the intake quantity Qa cannot be fully reduced only by controlling the EGR valve 11 to the set opening degree.

Therefore, if the actual intake quantity Qa does not decrease to the predetermined value or under or if the fuel injection quantity Qi does not increase to the predetermined value α or over even when the EGR valve 11 reaches the set opening degree, the opening degree of the EGR valve 11 may be further controlled such that the intake quantity Qa of the fresh air decreases. Then, when the actual intake quantity Qa becomes equal to or smaller than the predetermined value or when the fuel injection quantity Qi increases to the predetermined value α or over, the set opening degree may be replaced with the opening degree of the EGR valve 11 at the time or at the immediately preceding time.

Figure 3:
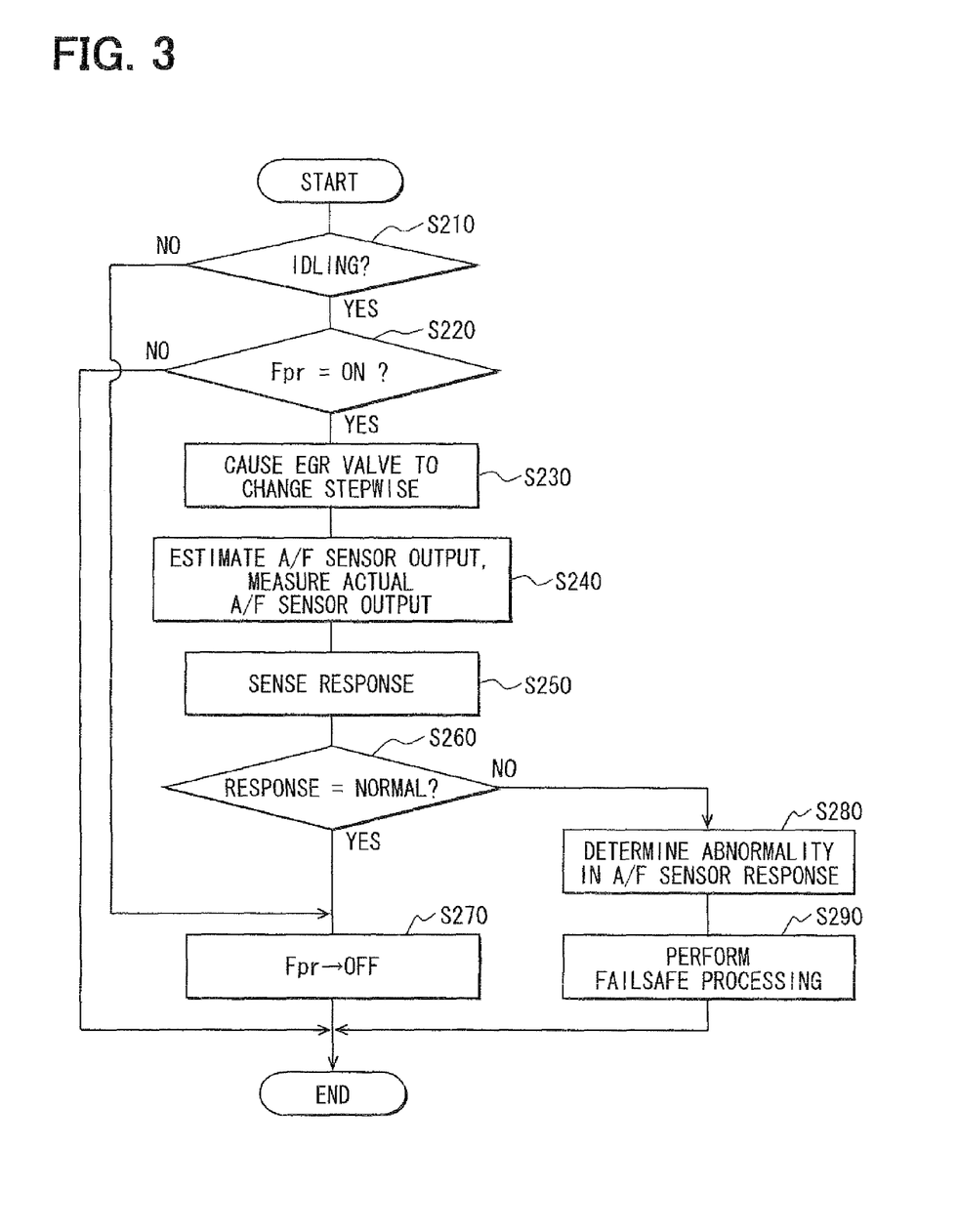
FIG. 3 is a flowchart showing response sensing processing of the exhaust gas component concentration sensor according to the embodiment.
Figure 4:
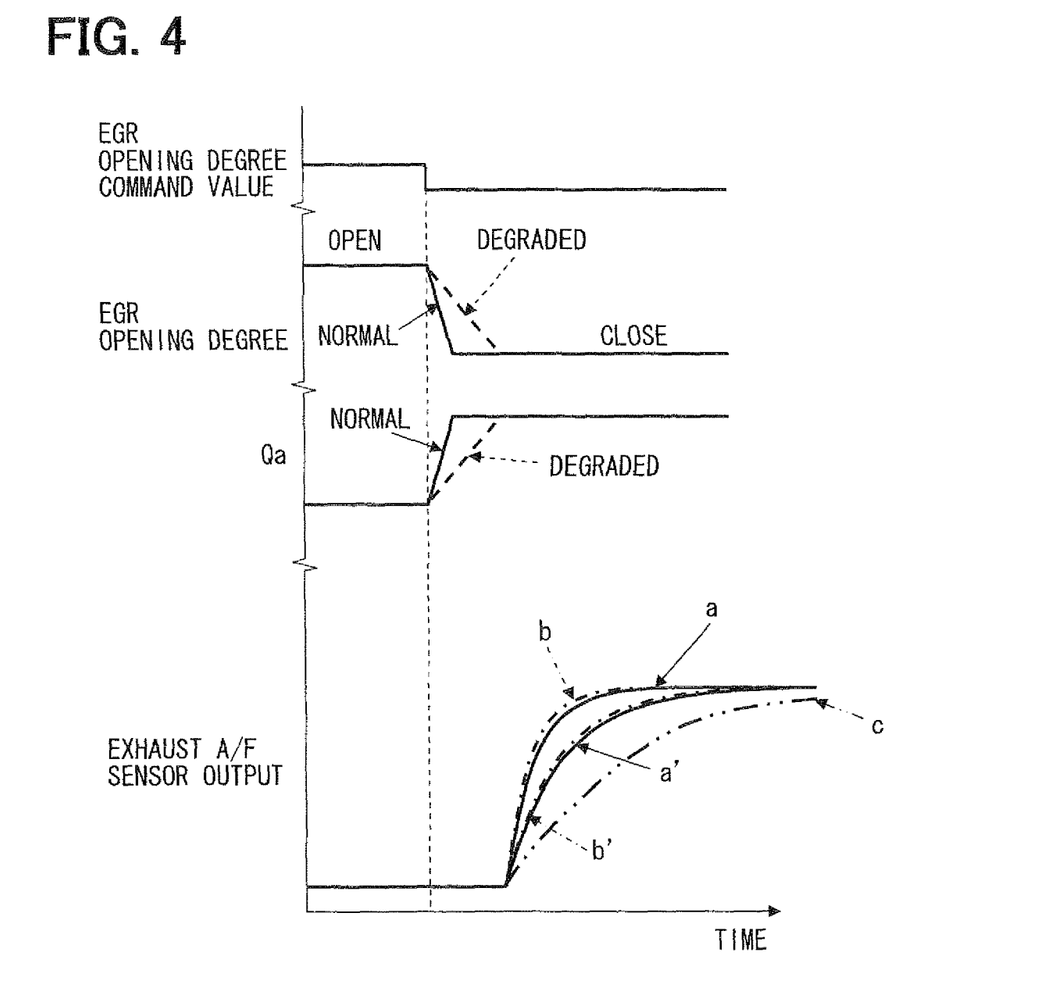
FIG. 4 is a waveform diagram showing an operation of the response sensing device according to the embodiment.
Figure 6:
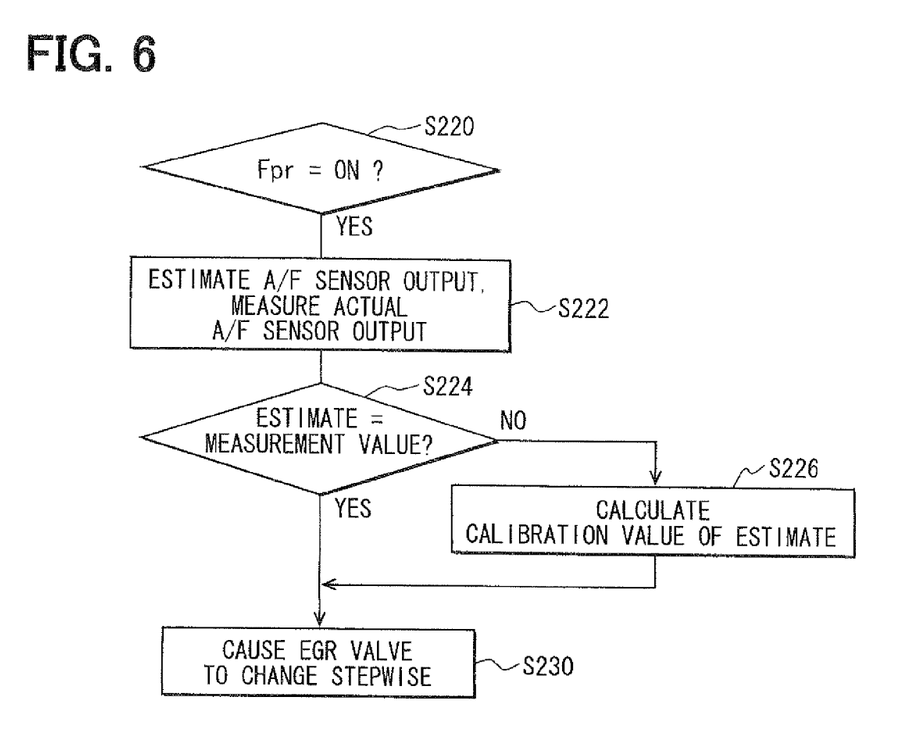
FIG. 6 is a flowchart showing response sensing processing of the exhaust gas component concentration sensor according to a second modified example of the embodiment.

Processing from S222 to S226 shown in FIG. 6 may be inserted between S220 and S230 of the flowchart of FIG. 3 showing the response sensing processing of the embodiment.

The processing from S222 to S226 is for calculating a calibration value for calibrating the estimate of the oxygen concentration when a difference occurs between the estimate of the oxygen concentration and the sensing value of the oxygen concentration sensed with the A/F sensor in the case where the operation state of the diesel engine is the idling state and is constant. The calibration value is used when the estimate of the oxygen concentration is calculated in S240. The estimate is increased or decreased by the calibration value. Thus, even when a deviation arises between the estimate of the oxygen concentration and the actual sensing value of the oxygen concentration, the deviation can be cancelled. Accordingly, the response of the A/F sensor 10 can be sensed with high accuracy by comparing the estimate of the oxygen concentration and the actual sensing value.

In the above-described embodiment, as an example of changing the intake quantity Qa stepwise, the example of increasing the intake quantity Qa stepwise from the sate where the intake quantity Qa has been decreased is explained. Alternatively, the intake quantity Qa may be decreased stepwise from a state where the intake quantity Qa has been increased to a state where the intake quantity Qa is decreased. Alternatively, the stepwise decrease and the stepwise increase of the intake quantity Qa may be performed alternately once or predetermined times respectively, and the response during the respective stepwise changes may be sensed. Then, the response diagnosis may be performed based on results of the multiple times of sensing.

In the above-described embodiment, the A/F sensor 10 is applied as the exhaust gas component concentration sensor of the diesel engine, and the response of the A/F sensor 10 is sensed. The exhaust gas component concentration sensor is not limited to the A/F sensor. For example, a NOx concentration sensor that senses the NOx concentration in the exhaust gas or a PM sensor that senses a particulate concentration in the exhaust gas may be applied as an exhaust gas component concentration sensor. It is because the NOx concentration and the particulate concentration also change if the intake quantity Qa changes. For example, if the intake quantity Qa of the fresh air decreases, the particulate matters become more apt to be generated and the particulate concentration increases. If the intake quantity Qa increases conversely, the particulate concentration decreases.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A response sensing device for an exhaust gas component concentration sensor, the response sensing device comprising:
    an intake air quantity measuring device provided to an intake pipe of a diesel engine and configured to measure an intake air quantity introduced into the diesel engine;
    an intake air quantity changing device configured to change the intake air quantity of the diesel engine;
    an exhaust gas component concentration estimating device configured to estimate a component concentration of exhaust gas after combustion in the diesel engine at least based on the measured intake air quantity and a fuel injection quantity injected and supplied to the diesel engine;
    an exhaust gas component concentration sensor provided to an exhaust pipe of the diesel engine for sensing an actual component concentration of the exhaust gas of the diesel engine; and
    a response sensing device configured to sense response of the exhaust gas component concentration sensor by comparing the exhaust gas component concentration estimated by the exhaust gas component concentration estimating device and the actual exhaust gas component concentration sensed by the exhaust gas component concentration sensor when compulsorily changing the intake air quantity with the intake air quantity changing means, wherein
    the response sensing device changes the intake air quantity stepwise with the intake air quantity changing device such that change in the intake air quantity becomes equal to or larger than a predetermined amount,
    the response sensing device gradually controls the intake air quantity changing device until the intake air quantity changing device reaches a predetermined set state such that the intake air quantity decreases gradually and confirms whether an abnormality occurs in the diesel engine at that time before changing the intake air quantity stepwise with the intake air quantity changing means, and
    when it is confirmed that the abnormality does not occur, the response sensing device uses the set state as an initial state or an end state of the intake air quantity changing device at the time when the intake air quantity is changed stepwise.

2. The response sensing device according to claim 1, further comprising:
    an injection quantity controlling device configured to control the fuel injection quantity such that rotation speed of the diesel engine remains constant regardless of decrease of the intake air quantity when the intake air quantity changing device is controlled gradually until the intake air quantity changing device reaches the predetermined set state such that the intake air quantity decreases gradually.

3. The response sensing device according to claim 2, wherein the response sensing device determines that the abnormality has occurred in the diesel engine if the fuel injection quantity increases to a predetermined injection quantity or over or if the actual intake air quantity decreases to a predetermined air quantity or under when the intake air quantity changing device is gradually controlled until the intake air quantity changing device reaches the predetermined set state.

4. The response sensing device according to claim 1, wherein the response sensing device senses the response of the exhaust gas component concentration sensor while the diesel engine is idling.

5. The response sensing device according to claim 1, wherein the exhaust gas component concentration estimating device calculates at least one of a normal estimate, which follows a characteristic of the exhaust gas component concentration sensor having normal response, and a degradation estimate, which follows a characteristic of the exhaust gas component concentration sensor having degraded response, as the estimate of the exhaust gas component concentration.

6. The response sensing device according to claim 5, wherein a response time of the degradation estimate, which follows the characteristic of the exhaust gas component concentration sensor having the degraded response, lengthens as flow velocity of the exhaust gas decreases as compared to the normal estimate, which follows the characteristic of the exhaust gas component concentration sensor having the normal response.

7. The response sensing device according to claim 1, wherein the exhaust gas component concentration estimating device calculates the exhaust gas component concentration at a position of a cylinder of the diesel engine first and then calculates the estimate of the exhaust gas component concentration, which is to be compared with the actual exhaust gas component concentration sensed with the exhaust gas component concentration sensor, in consideration of a delay until the exhaust gas component concentration calculated as the concentration at the position of the cylinder is sensed with the exhaust gas component concentration sensor.

8. The response sensing device according to claim 1, wherein
the exhaust gas component concentration estimating device has a map beforehand storing a relationship between the exhaust gas component concentration and at least the intake air quantity and the fuel injection quantity, and
the exhaust gas component concentration estimating device estimates the exhaust gas component concentration using the map.

9. The response sensing device according to claim 1, further comprising:
an injection quantity controlling device configured to control the fuel injection quantity such that rotation speed of the diesel engine remains constant before and after the change of the intake air quantity when the intake air quantity is changed stepwise with the intake air quantity changing means.

10. The response sensing device according to claim 1, wherein the exhaust gas component concentration estimating device calculates a calibration value for calibrating the estimate of the exhaust gas component concentration when an operation state of the diesel engine is constant and there occurs a difference between the estimate of the exhaust gas component concentration and the actual exhaust gas component concentration sensed with the exhaust gas component concentration sensor.

11. The response sensing device according to claim 10, wherein the exhaust gas component concentration estimating device performs the calculation of the calibration value of the estimate of the exhaust gas component concentration before the response of the exhaust gas component concentration sensor is sensed.

12. The response sensing device according to claim 1, further comprising:
an abnormality detecting device configured to detect an abnormality in the intake air quantity measuring means, wherein
the sensing of the response of the exhaust gas component concentration sensor is prohibited when the abnormality in the intake air quantity measuring device is detected by the abnormality detecting means.

13. The response sensing device according to claim 12, wherein the abnormality detecting device detects that the intake air quantity measuring device is abnormal when the response sensing device detects that the exhaust gas component concentration sensor has response quicker than a predetermined standard response.

14. A response sensing device for an exhaust gas component concentration sensor, the response sensing device comprising:
an intake air quantity measuring device provided to an intake pipe of a diesel engine for measuring an intake air quantity introduced into the diesel engine;
an intake air quantity changing device configured to change the intake air quantity of the diesel engine;
an exhaust gas component concentration estimating device configured to estimate a component concentration of exhaust gas after combustion in the diesel engine at least based on the measured intake air quantity and a fuel injection quantity injected and supplied to the diesel engine;
an exhaust gas component concentration sensor provided to an exhaust pipe of the diesel engine for sensing an actual component concentration of the exhaust gas of the diesel engine; and
a response sensing device configured to sense response of the exhaust gas component concentration sensor by comparing the exhaust gas component concentration estimated by the exhaust gas component concentration estimating device and the actual exhaust gas component concentration sensed by the exhaust gas component concentration sensor when compulsorily changing the intake air quantity with the intake air quantity changing means, wherein
the response sensing device changes the intake air quantity stepwise with the intake air quantity changing device such that change in the intake air quantity becomes equal to or larger than a predetermined amount,
the response sensing device gradually controls the intake air quantity changing device until the intake air quantity changing device reaches a predetermined set state such that the intake air quantity decreases gradually before changing the intake air quantity stepwise with the intake air quantity changing means,
when the actual intake air quantity decreases to a predetermined air quantity or under or when the fuel injection quantity increases to a predetermined injection quantity or over during the gradual control, the response sensing device changes the set state based on a state of the intake air quantity changing device at that time, and
the response sensing device uses the set state as an initial state or an end state of the intake air quantity changing device at the time when the intake air quantity is changed stepwise.

15. The response sensing device according to claim 14, wherein
the response sensing device further controls the intake air quantity changing device to decrease the intake air quantity if the actual intake air quantity does not decrease to the predetermined air quantity or under or if the fuel injection quantity does not increase to the predetermined injection quantity or over even when the intake air quantity changing device reaches the set state, and
the response sensing device changes the set state based on a state of the intake air quantity changing device at the time when the actual intake air quantity becomes equal to or smaller than the predetermined air quantity or when the fuel injection quantity becomes equal to or larger than the predetermined injection quantity.

* * * * *